Oct. 10, 1939.  J. VAN HULST  2,175,804

PROCESS FOR IMPERMEABILIZING LOOSE SUBSOIL LAYERS OR THE LIKE

Filed Jan. 17, 1936

INVENTOR
JAN VAN HULST.
BY
Samuel Stearman
ATTORNEY

Patented Oct. 10, 1939

2,175,804

UNITED STATES PATENT OFFICE 2,175,804

PROCESS FOR IMPERMEABILIZING LOOSE SUBSOIL LAYERS OR THE LIKE

Jan van Hulst, Amsterdam, Netherlands, assignor to The Patent and Licensing Corporation, Boston, Mass., a corporation of Massachusetts Application January 17, 1936, Serial No. 59,490
In the Netherlands October 14, 1935

3 Claims. (Cl. 61—36)

The invention concerns a process for applying layers or screens impermeable or substantially impermeable to water or gases in porous and pervious grounds and other masses, such as subsoil sand layers, gravel, natural and artificial rocks, masonry or concrete constructions, stone dumpings and the like, for filling up and tightening the voids, cracks or fissures and the like in these masses and/or improving the cohesion of and fixing loose soils and the like, as also for tightening wells or bore hole walls.

For the above-mentioned purposes it is already known to treat the soils or other masses with impregnating agents of a varying nature, such as aqueous dispersions of bituminous substances, cement or clay suspensions, or precipitate-forming chemicals, e. g. silicic acid and aluminium silicate.

I have now found according to the present invention that in carrying these known processes into practice improved results may be attained in many respects by a successive application of impregnating agents of the same or of different kinds in two or more stages, in order to bring about the desired impermeabilization, tightening or fixation of the mass treated.

In carrying out the known impermeabilization processes the drawback is often experienced that the production of the impermeable screens in the mass treated requires rather considerable quantities of impregnating agent. Thus, for instance, an impervious screen in a sand soil is made by introducing the respective impregnating liquids by means of injection pipes drilled in at regular distances, in such quantities as to cause the soil masses impregnated from the various centres of injection to merge into one another. The considerable thickness of the screen thus obtained naturally involves a large consumption of material.

Now, the process according to the invention, allowing of producing screens of small thickness or even films, thus reducing the requisite quantity of material, consists in first producing a stationary partial tightening at the place where the screen has to be applied, and subsequently causing an impermeabilizing agent to be displaced towards said partly impermeabilized mass, which results in an impervious screen or film being formed on the spot where the said impermeabilizing agent comes into contact with the partly impregnated mass previously produced. When operating in this manner a relatively thin screen or film may suffice to bring about a very adequate impermeabilization.

In carrying out the process according to the invention either the same or a similar impregnating agent may be used for the previous, partial impermeabilization and for the final impermeabilization, or different impregnating agents may be used in the various stages of the process. Thus, for instance, use may be made in the various stages of the process of bitumen dispersions, which may, if desired, be mixed with fillers, or the application of such bitumen dispersions in one or more stages of the process may be combined with that of other impregnating agents, such as cement or clay suspensions, precipitate-forming chemicals, etc., in one or more other stages of the process, or one may work without bitumen dispersion in any of the stages of the process.

An advantage of the process is that in many cases a very favourable result may be obtained with the use of relatively very dilute dispersions or solutions, whereby a considerable saving of impregnating material may be realized.

More especially with regard to the use of bitumen dispersions the present process may be advantageously combined with that according to my co-pending application, filed November 26, 1935, Serial No. 51,602 upon which Patent No. 2,051,505 was granted August 18, 1936. According to the latter process there is first introduced into the mass to be treated a stabilized bitumen dispersion which does not coagulate during its penetration and subsequently a bitumen dispersion of less stability or having a greater tendency to coagulate, which is caused to coagulate at the desired place.

One may proceed in such a manner that only a partial impermeabilization is produced by coagulation of the bitumen dispersion last introduced. Thereafter, by pumping of the ground water or in some other manner, the bitumen dispersion first introduced is caused to flow back towards the partly impermeabilized mass, in such a manner that on coming into contact therewith the said first bitumen dispersion is filtered off and coagulated. In this manner an impermeable screen is formed at the place of contact against the partly impermeabilized mass.

Instead of in two stages the process according to the invention may also be carried out in several stages and various combinations.

In some cases it may suffice in the first stage of the process to effect a temporary tightening, which may be resolved after application of the definite screen by the tightening agent being washed away with water or losing its structure through biological, chemical or other agencies. Substances coming into consideration in this respect are, for instance, organic colloids, which are caused to coagulate or swell at the desired place, such as polysaccharides, gums, proteins, e. g., a solution of casein or skimmed milk.

Some embodiments of the invention are elucidated further by the following examples, in which reference is made to the accompanying drawing. All the percentages and ratios are by weight.

Figure 1:
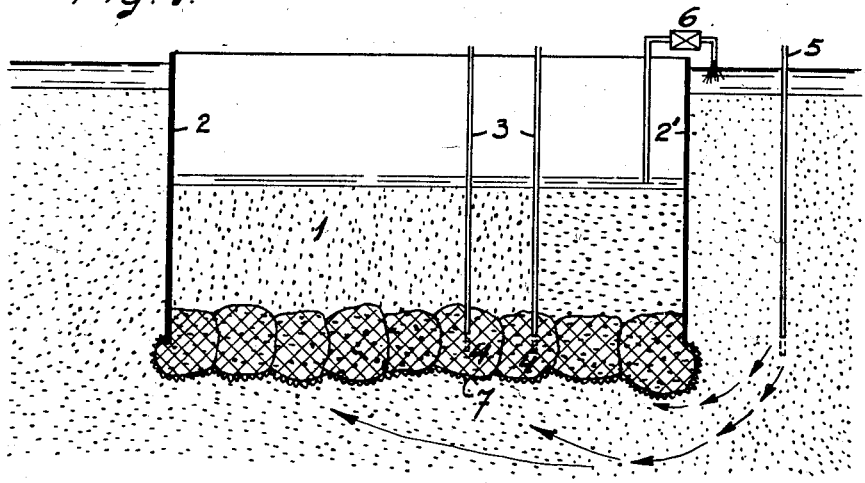
Fig. 1 illustrates the carrying out of my process for the making of an impervious screen in the bottom of a building excavation.

Example I (vide Fig. 1)

For the purpose of making an impervious screen in the bottom 1 of a building excavation at the level of the foot of the sheet piling 2, 2', there is injected into the said ground by means of pipes 3 a quantity of a diluted bitumen dispersion, e. g., a 5% dispersion prepared by dispersing mineral oil distillation bitumen in a ½% soap solution, so that the dispersion flowing from each pipe coagulates in the surrounding ground mass 4, 4' and produces a partial impermeabilization thereof.

Thereupon, in order to complete the impermeabilization, there is applied by means of one or more pipes 5, disposed inside or outside the bottom of the excavation, a second diluted bitumen dispersion, e. g. a 3% dispersion prepared by dispersing bitumen in a ½% soap solution and stabilized by adding 2% of casein, calculated on bitumen, said dispersion being so stable as not to coagulate before having reached the partly impermeabilized ground mass 4, 4'. The movement of this second dispersion to the partly impermeabilized ground mass 4, 4' may be effected by withdrawing water from the opposite side of said mass by means of a pump 6, thus creating an artificial flow of water in the direction of the partly impermeabilized ground mass. In this manner there is formed an impervious screen 7 against the partly impermeabilized mass by filtering off and coagulation of the bitumen particles.

Example II

The process according to Example I may also be modified as follows:

Through the pipes 3 there is first injected the last mentioned, stabilized bitumen dispersion of Example I. Owing to its great stability this dispersion does not coagulate rapidly, but penetrates further into the surrounding subsoil, where it displaces the ground water. Then the first mentioned bitumen dispersion of Example I is introduced through the same pipes, which latter dispersion displaces the bitumen dispersion already present in the soil and rapidly coagulates, as a result of which the ground mass 4, 4' is partly impermeabilized. Thereupon an articficial flow of water is created by means of the pump 6 in the manner described in Example I, the uncoagulated dispersion being returned to the partly impermeabilized ground mass 4, 4' and, on coming into contact therewith, forming an impervious screen 7 by filtering off and coagulation of the bitumen particles.

Figure 2:
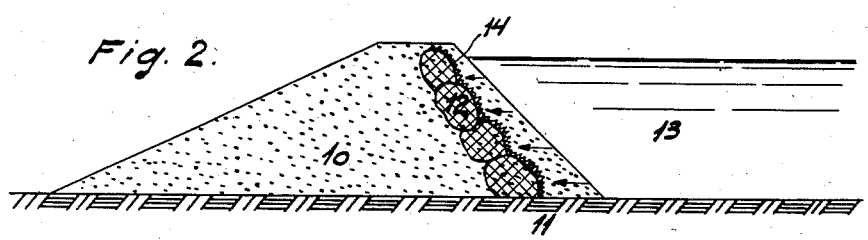
Fig. 2 illustrates the carrying out of my invention for making an impervious screen in a pervious canal dike.

Example III (vide Fig. 2)

In order to make an impervious screen in a pervious canal dike 10, a partly impermeabilized layer 12 is produced in the body 10 of the dike above the impervious subsoil 11 by separate but simultaneous injection of limited quantities of a 5% waterglass solution and a 2% calcium chloride solution. Thereupon there is introduced into the water 13 of the canal such a quantity of clay suspension that by percolating through the canal dike 10 and filtering of the clay particles against the partly impermeabilized layer 12 an impervious screen 14 is formed.

Figure 3:
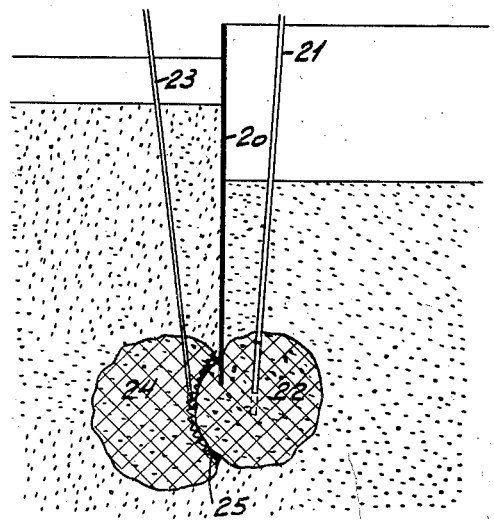
Fig. 3 illustrates the use of the invention in lengthening the screen formed by a sheet piling.

Example IV (vide Fig. 3)

In order to lengthen the impervious screen formed by a sheet piling 20 injections are carried out near the foot of this piling at mutual distances of 3 m. by means of pipes 21, using a 5% dispersion of bitumen in a 1% soap solution, to which 1% of clay and 2% of ethyl formate (the latter calculated on bitumen) have been added. The dispersion coagulates after some time and produces a partial impermeabilization at 22. On the opposite side of the sheet piling a series of injections is carried out in a similar manner through the pipes 23, as near as possible to the partly impermeabilized ground mass 22, with a 2% dispersion of coal tar in a 0.1% lye solution. This dispersion spreads over the ground mass 24, and where it comes into contact with the mass 22 an impervious screen 25 is formed by filtering off.

What I claim is:

1. A process for making impervious, tightening or fixing pervious or loose subsoil layers such as sand soils or other porous masses, which comprises first introducing an aqueous dispersion of bitumen into the mass to form a partially impermeable partition, and subsequently introducing an impermeabilizing agent to form an impervious screen against the partially impermeabilized partition.

2. A process for making impervious, tightening or fixing pervious or loose subsoil layers such as sand soils or other porous masses, which comprises introducing a relatively rapidly coagulating bitumen dispersion into the mass to form a partially impermeable partition, and forming an impervious screen against the partially impermeabilized mass by coagulating a more stable bitumen dispersion thereon.

3. A process for making impervious, tightening or fixing pervious or loose subsoil layers such as sand soils or other porous masses which comprises introducing a relatively rapidly coagulating aqueous dispersion of bitumen to form a partially impermeable partition and then introducing a relatively more stable bitumen dispersion against the partition to form an impermeable screen thereon.

JAN van HULST.